P. A. NORMANDIN.
TIRE PROTECTOR.
APPLICATION FILED AUG. 8, 1911.

1,116,725.

Patented Nov. 10, 1914.

WITNESSES
G. M. Spring
F. D. Owen

INVENTOR
Paul A. Normandin,
by
his Attorney

UNITED STATES PATENT OFFICE.

PAUL A. NORMANDIN, OF BOSTON, MASSACHUSETTS.

TIRE-PROTECTOR.

1,116,725.  Specification of Letters Patent.  Patented Nov. 10, 1914.

Application filed August 8, 1911. Serial No. 642,926.

*To all whom it may concern:*

Be it known that I, PAUL A. NORMANDIN, a citizen of the United States, residing at Boston, in the county of Suffolk and State of Massachusetts, have invented new and useful Improvements in Tire-Protectors, of which the following is a specification.

My invention relates to protectors for pneumatic tires for automobiles or the like. An object of this invention is to provide means whereby the same may be securely held around the inner tube of the tire, in such a manner that it will not slip or otherway injure the inner tube.

A still further object is to provide a protector which can be easily attached to or detached from a tire.

With the foregoing and other objects in view my invention relates to such details of construction and in the arrangement and combination of parts as will be hereinafter fully described and specifically pointed out in the appended claim.

In describing my invention in detail, reference will be had to the accompanying drawings wherein like characters denote like or corresponding parts throughout the several views, and in which:—

Figure 1:
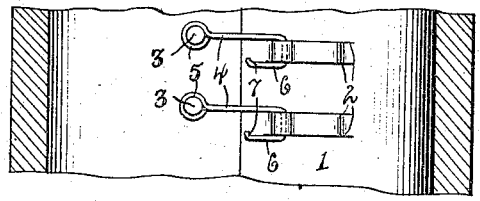
Figure 2:
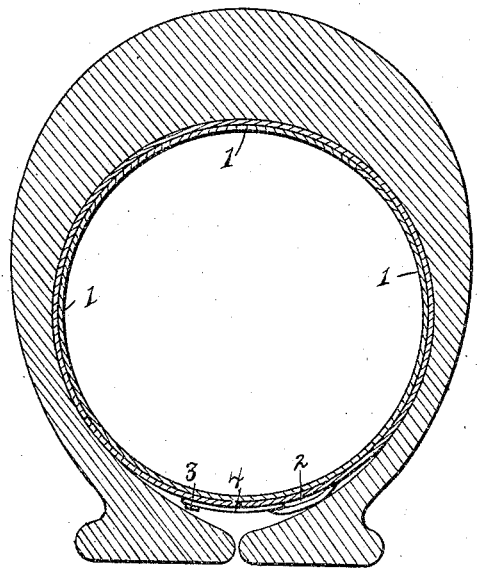
Figure 3:
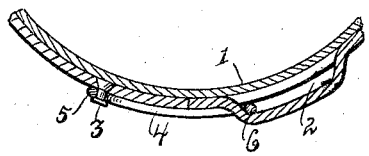

Figure 1 is a sectional view of a tire, the means for fastening the sides of my protector being clearly shown. Fig. 2 is a cross sectional view of a tire showing my protector inserted therein. Fig. 3 is a detail view.

In the drawings I have shown my protector attached to an ordinary automobile tire.

My protector is adapted to be disposed between the outer shoe and the inner tube of the tire. This protector I construct preferably of sheet metal such (for instance) as steel. It is well known that sheet steel contains a great amount of elasticity so when the same is used for a protector it not only protects the inner tube from being punctured but also adds a great amount of elasticity to the tire. I also provide means for securely holding the sides of my protector together in contacting relation. These means are disposed upon the outer side of the same so that they will on no occasion contact with the inner tube and thereby puncture the same.

I form at certain points along one side of my protector 1 the pairs of slits 2. Disposed on the other side of my protector at certain points opposite the slits formed in the other side are the rivets 3, which are adapted to securely hold one end of the hooks 4, as shown at 5 in the drawings. The other ends of the hooks 4 are curved as shown at 6. The end 6 is adapted to be inserted in one of the slits 2, and brought out through another of the slits. I have shown a slightly enlarged portion on the ends of the hooks 4. This helps to keep the ends from slipping out through the slits after they have been drawn through.

It should be noted that the edges of the resilient strip which forms the tire protector meet in contacting relation and are held in this position by the hooks 4. These hooks 4 engage the eyes 2 and after the hooks are in engagement with the eyes, the edge portions of the strip will be prevented from moving to overlapping relation and will also be prevented from spreading apart. It should also be noted that the resiliency of the protector would prevent any danger of the hooks working out of the eyes.

It is thought from the foregoing that the advantages and novel features of the simple device hereinbefore disclosed will be appreciated.

Having thus fully described my invention, what I claim as new and desire to secure by Letters Patent, is:—

A tire protector formed of a strip of resilient material bent to form a tube having the edges of the strip meeting in contacting relation, and securing means connected with said strip upon one side of the contacting edges and releasably engaging the opposite edge portions of the strip, the resiliency of the strip holding the fastening means in a position to hold the edges in contacting relation and said fastening means preventing the edge portions of said strip from extending in overlapping relation.

PAUL A. NORMANDIN.

Witnesses:
LOUIS E. LAMIAT,
HAROLD I. HALL.